United States Patent
Gupta et al.

(10) Patent No.: US 10,887,306 B2
(45) Date of Patent: Jan. 5, 2021

(54) AUTHENTICATING AN UNKNOWN DEVICE BASED ON RELATIONSHIPS WITH OTHER DEVICES IN A GROUP OF DEVICES

(71) Applicant: International Business Machines Corporation, Armonk, NY (US)

(72) Inventors: Rahul Gupta, Austin, TX (US); David B. Kumhyr, Austin, TX (US); Hari H. Madduri, Austin, TX (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 15/593,154

(22) Filed: May 11, 2017

(65) Prior Publication Data

US 2018/0332065 A1 Nov. 15, 2018

(51) Int. Cl.
| H04L 29/06 | (2006.01) |
| H04W 12/00 | (2009.01) |
| H04W 4/70 | (2018.01) |
| H04W 12/08 | (2009.01) |

(52) U.S. Cl.
CPC ........ *H04L 63/0853* (2013.01); *H04L 63/101* (2013.01); *H04W 4/70* (2018.02); *H04W 12/00506* (2019.01); *H04W 12/08* (2013.01)

(58) Field of Classification Search
CPC ...... H04L 63/14; H04L 63/04; H04L 63/1425
See application file for complete search history.

(56) References Cited

U.S. PATENT DOCUMENTS

| 6,496,979 B1 | 12/2002 | Chen et al. |
| 7,307,999 B1 | 12/2007 | Donaghey |
| 8,423,687 B2 | 4/2013 | Srinivansan et al. |
| 8,869,235 B2 | 10/2014 | Qureshi et al. |
| 8,874,162 B2 | 10/2014 | Schrader et al. |
| 9,100,829 B2 | 8/2015 | Lee |
| 9,110,732 B1 | 8/2015 | Forschmiedt et al. |
| 9,112,749 B2 | 8/2015 | Dabbiere et al. |

(Continued)

FOREIGN PATENT DOCUMENTS

| CN | 102036231 | 4/2011 |
| DE | 4339460 | 4/1995 |

OTHER PUBLICATIONS

Atzori et al., "Siot: Giving a Social Structure to the Internet of Things", IEEE Communications Letters, vol. 15., No. 11, Nov. 2011, Total 3 pages.

(Continued)

*Primary Examiner* — Wasika Nipa
(74) *Attorney, Agent, or Firm* — Janaki K. Davda; Konrad, Raynes, Davda and Victor LLP

(57) ABSTRACT

Provided are techniques for authenticating an unknown device. For a first device in an internet of things network that includes a second device and forms a list of trusted devices, a distance between the first device and the second device is determined. A level of trust for the second device is identified based on the distance, wherein the level of trust specifies a level of data sharing. Reputation ranking is performed for the second device based on the level of trust. The reputation ranking is used to assign a trust score to the second device. Based on determining that the trust score exceeds a trust threshold, access is provided to the second device.

20 Claims, 9 Drawing Sheets

(56) References Cited

U.S. PATENT DOCUMENTS

| | | | |
|---|---|---|---|
| 9,185,099 B2 | 11/2015 | Brannon | |
| 9,307,451 B1 | 4/2016 | Kodeswaran et al. | |
| 9,578,188 B1 | 2/2017 | Kircher et al. | |
| 9,602,508 B1 | 3/2017 | Mahaffey et al. | |
| 9,608,809 B1 | 3/2017 | Ghetti et al. | |
| 9,635,014 B2 | 4/2017 | Venkataraman et al. | |
| 9,665,702 B2 | 5/2017 | King et al. | |
| 9,672,338 B1 | 6/2017 | Kim et al. | |
| 9,710,649 B2 | 7/2017 | Da Palma | |
| 9,917,862 B2 | 3/2018 | Phanse et al. | |
| 10,623,389 B2 | 4/2020 | Childress et al. | |
| 2006/0248573 A1* | 11/2006 | Pannu | G06F 21/62 726/1 |
| 2007/0078944 A1 | 4/2007 | Charlebois et al. | |
| 2008/0086777 A1 | 4/2008 | Sanchez | |
| 2008/0263511 A1 | 10/2008 | Shapiro | |
| 2011/0023123 A1 | 1/2011 | King et al. | |
| 2011/0065419 A1 | 3/2011 | Book et al. | |
| 2012/0084184 A1 | 4/2012 | Raleigh et al. | |
| 2012/0129503 A1 | 5/2012 | Lindeman et al. | |
| 2012/0216242 A1 | 8/2012 | Uner et al. | |
| 2012/0291102 A1 | 11/2012 | Cohen | |
| 2012/0309464 A1 | 12/2012 | Lim et al. | |
| 2013/0007245 A1 | 1/2013 | Malik et al. | |
| 2013/0080522 A1 | 3/2013 | Ren | |
| 2014/0033315 A1 | 1/2014 | Biswas et al. | |
| 2014/0040977 A1 | 2/2014 | Barton et al. | |
| 2014/0068755 A1 | 3/2014 | King et al. | |
| 2014/0181959 A1 | 6/2014 | Li et al. | |
| 2014/0215590 A1 | 7/2014 | Brand | |
| 2014/0244834 A1 | 8/2014 | Guedalia et al. | |
| 2014/0250145 A1 | 9/2014 | Jones et al. | |
| 2014/0280934 A1 | 9/2014 | Reagan et al. | |
| 2014/0282610 A1 | 9/2014 | Strom et al. | |
| 2014/0282822 A1* | 9/2014 | Dunne | H04L 63/20 726/1 |
| 2014/0337528 A1 | 11/2014 | Barton et al. | |
| 2015/0007273 A1* | 1/2015 | Lin | H04L 63/08 726/4 |
| 2015/0019714 A1 | 1/2015 | Shaashua et al. | |
| 2015/0032655 A1 | 1/2015 | Said et al. | |
| 2015/0135277 A1* | 5/2015 | Vij | H04L 63/0892 726/4 |
| 2015/0150130 A1 | 5/2015 | Fiala et al. | |
| 2015/0207809 A1 | 7/2015 | MacAulay | |
| 2015/0215772 A1 | 7/2015 | Gattu et al. | |
| 2015/0237071 A1 | 8/2015 | Maher et al. | |
| 2015/0244743 A1 | 8/2015 | Jagad et al. | |
| 2015/0249617 A1 | 9/2015 | Chang et al. | |
| 2015/0269383 A1 | 9/2015 | Lang et al. | |
| 2015/0319252 A1 | 11/2015 | Momchilov et al. | |
| 2015/0358332 A1 | 12/2015 | Glickfield et al. | |
| 2015/0373023 A1 | 12/2015 | Walker | |
| 2016/0005029 A1 | 1/2016 | Ivey et al. | |
| 2016/0006755 A1 | 1/2016 | Donnelly et al. | |
| 2016/0087956 A1 | 3/2016 | Maheshwari et al. | |
| 2016/0094560 A1 | 3/2016 | Stuntebeck | |
| 2016/0112260 A1 | 4/2016 | Pai et al. | |
| 2016/0156596 A1 | 6/2016 | Chen | |
| 2016/0188307 A1 | 6/2016 | Reagan et al. | |
| 2016/0191560 A1 | 6/2016 | Pegna et al. | |
| 2016/0205106 A1 | 7/2016 | Yacoub et al. | |
| 2016/0212099 A1 | 7/2016 | Zou et al. | |
| 2016/0259924 A1 | 9/2016 | Dutt et al. | |
| 2016/0261621 A1 | 9/2016 | Srivastava et al. | |
| 2016/0269436 A1* | 9/2016 | Danielson | H04L 63/1433 |
| 2016/0284035 A1 | 9/2016 | Muttik | |
| 2016/0301707 A1 | 10/2016 | Cheng et al. | |
| 2016/0373431 A1 | 12/2016 | Van Den Broeck et al. | |
| 2017/0048251 A1 | 2/2017 | Guday et al. | |
| 2017/0094509 A1 | 3/2017 | Mistry et al. | |
| 2017/0111247 A1 | 4/2017 | Uchiyama et al. | |
| 2017/0195303 A1 | 7/2017 | Smith et al. | |
| 2017/0238753 A1 | 8/2017 | Merali et al. | |
| 2017/0295057 A1 | 10/2017 | Dost et al. | |
| 2020/0053069 A1 | 2/2020 | Childress et al. | |

OTHER PUBLICATIONS

Bao et al., "Trust Management for the Internet of Things and Its Application to Service Composition", dated 2012, World of Wireless, Mobile and Multimedia Networks (WoWMoM), 2012 IEEE International Symposium, Total 6 pages.

Copigneaux et al.,"Semi-Autonomous, Context-Aware, Agent Using Behaviour Modelling and Reputation Systems to Authorize Data Operation in the Internet of Things", Internet of Things (WF-IoT), 2014 IEEE World Forum, dated 2014, Total 6 pages.

Kopetz, H., Real-Time System Series, Chaper 13, Internet of Things, dated 2011, Total 17 pages.

Li, "Study on Security Architecture in the Internet of Things", dated 2012, International Conference on Measurement, Information and Control (MIC), Total 4 pages.

Mell et al.,"Effectively and Securely Using the Cloud Computing Paradigm", dated Oct. 7, 2009, NIST Cloud Computing Resources, Total 80 pages.

Mell et al., "The NIST Definition of Cloud Computing", dated Sep. 2011, Recommendations of the National Institute of Standards and Technology, Computer Security Division Information Technology Laboratory National Institute of Standards and Technology, , Total 7 pages.

Miettinen, et al., "Poster: Friend or Foe? Context Authentication for Trust Domain Separation in IoT Environments", dated 2016, Proceedings of the 9th ACM Conference on Security & Privacy in Wireless and Mobile Networks, Total 2 pages.

Nitti et al., "Friendship Selection in the Social Internet of Things: Challenges and Possible Strategies" dated 2015, IEEE Internet of Things Journal, Total 8 pages.

Tormo et al., "Dynamic and Flexible Selection of a Reputation Mechanism for Heterogeneous Environments", dated 2015, Future Generation Computer Systems, Total 12 pages.

Xiao et al., "Guarantor and Reputation Based Trust Model for Social Internet of Things", dated 2015, International Wireless Communications and Mobile,School of Computer Science University of Hertfordshire, Total 6 pages.

Yan et al., "TruSMS : A Trustworthy SMS Spam Control System Based on Trust Management" dated Jul. 2014, Journal of Network and Computer Applications, Total 17 pages.

"Identity and Access Management for the iot", IoT Working Group, 2016, (Available at: https://downloads.cloudsecurityalliance.org/assets/research/internet-of-things/identity-and-access-management-for-the-iot.pdf), Total 14 pages.

"Securing the Internet of Things: A Proposed Framework" dated Jan. 31, 2017, (online) retrieved from the Internet at URL> http://www.cisco.com/c/en/us/about/security-center/secure-iot-proposed-framework.html,Total 9 pages.

"Authentication Controlling Access to Complex Networks", Infineon Technologies, Semiconductor and System Solutions, May 10, 2017, (Available at: http://www.infineon.com/cms/en/applications/chip-card-security/internet-of-things-security/authentication/) Total 10 pages.

Myrick, A. "Google aims to get rid of passwords to replace them with 'trust scores'", dated May 24, 2016, (online), retrieved from the Internet at URL http://phandroid.com/2016/05/24/google-trust-score-passwords/, Total 3 pages.

U.S. Patent Application, dated May 11, 2017, for U.S. Appl. No. 15/593,164, filed May 11, 2017, invented by Rhonda L. Childress et al., Total 38 pages.

List of IBM Patents or Patent Applications Treated As Related, pp. 2, dated May 11, 2017.

Response to Final Office Action, dated Jul. 10, 2019, for U.S. Appl. No. 15/593,164, filed May 11, 2017, invented by Rhonda Childress et al., Total 16 pages.

Office Action, dated Dec. 14, 2018, for U.S. Appl. No. 15/593,164, filed May 11, 2017, invented by Rhonda L. Childress et al., Total 44 pages.

(56) References Cited

OTHER PUBLICATIONS

Response to Office Action, dated Mar. 12, 2019, for U.S. Appl. No. 15/593,164, filed May 11, 2017, invented by Rhonda L. Childress et al., Total 18 pages.
Final Office Action, dated Apr. 11, 2019, for U.S. Appl. No. 15/593,164, filed May 11, 2017, invented by Rhonda L. Childress et al., Total 33 pages.
Notice of Allowance, dated Jul. 25, 2019, for U.S. Appl. No. 15/593,164, filed May 11, 2017, invented by Rhonda L. Childress et al., Total 26 pages.
312 Amendment, dated Jan. 28, 2020, for U.S. Appl. No. 15/593,164 filed May 11, 2017, Total 8 pages.
U.S. Patent Application, dated Oct. 18, 2019, for U.S. Appl. No. 16/657,687 filed Oct. 18, 2019, Total 38 pages.
Preliminary Amendment, dated Oct. 18, 2019, for U.S. Appl. No. 16/657,687 filed Oct. 18, 2019, Total 7 pages.
List of Patents and Publications Treated as Related, dated Jan. 28, 2020, Total 2 pages.
Office Action1, dated Aug. 19, 2020, for U.S. Appl. No. 16/657,687 filed Oct. 18, 2019, Total 41 pages.
Notice of Allowance dated Dec. 4, 2019, pp. 17, for U.S. Appl. No. 15/593,164.
Response to Office Action1, dated Nov. 18, 2020, for U.S. Appl. No. 16/657,687, filed Oct. 18, 2019, Total 19 pages.

* cited by examiner

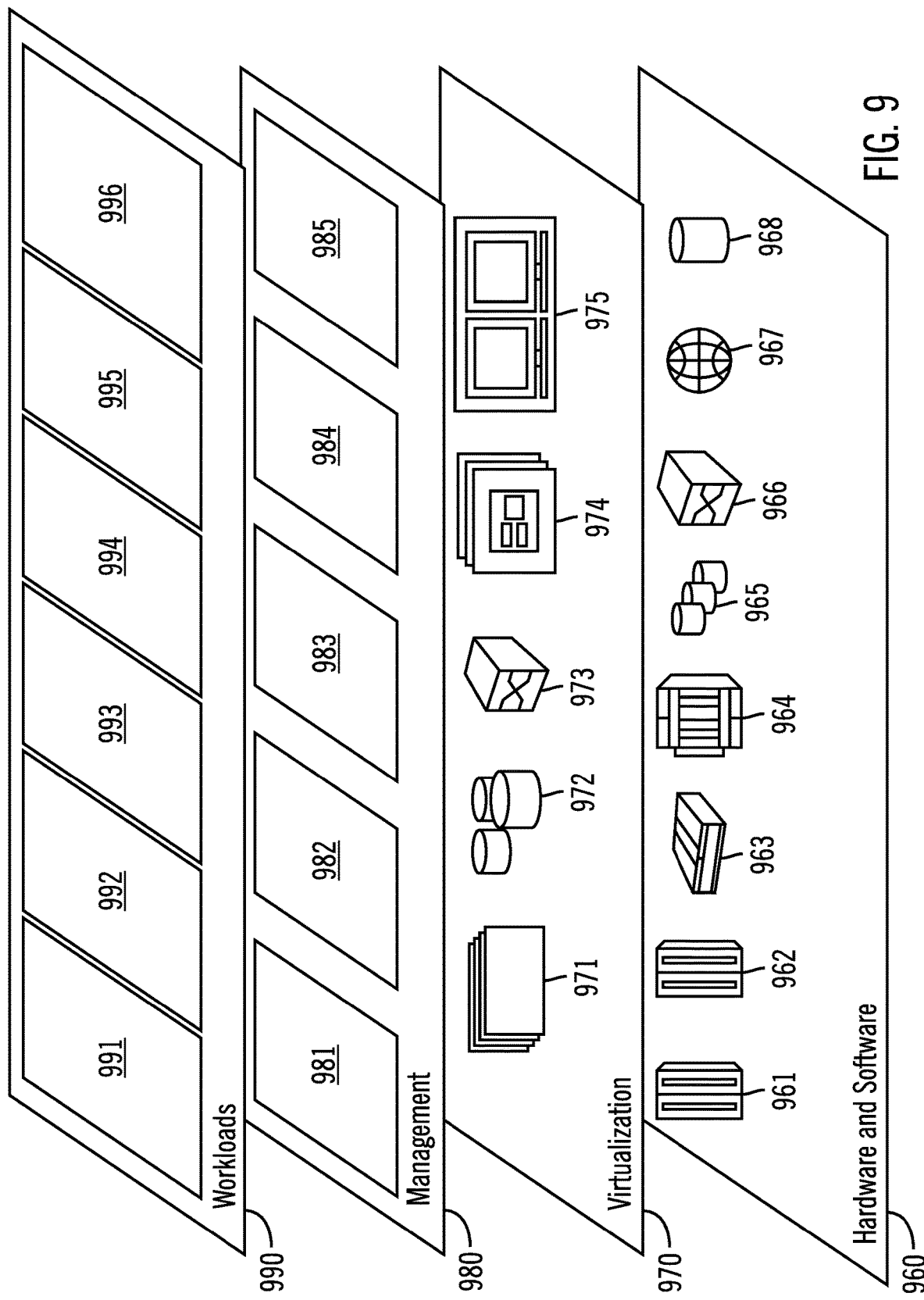

US 10,887,306 B2

AUTHENTICATING AN UNKNOWN DEVICE BASED ON RELATIONSHIPS WITH OTHER DEVICES IN A GROUP OF DEVICES

BACKGROUND

Embodiments of the invention relate to authenticating an unknown device based on relationships of that unknown device with other devices in a group of devices. The devices may be Internet of Things (IoT) devices. The authentication may be based on trusted and untrusted relationships or may be based on trust scores assigned by the other devices.

The Internet of Things (IoT) may be described as a group of devices that are connected to the Internet and communicate with each other and/or the rest of the internet. Each of the devices typically has electronics and software to enable that device to collect information and communicate that information with other devices. For example, a device may have a sensor to receive, as well as, track information.

A problem in IOT inter-device communication is establishing the identity of a first device that is requesting the access of a second device. Sometimes the accessing, first device is part of the same cluster of devices as the second device. Sometimes the accessing, first device is located in the same physical network as the second device. In other cases, the accessing, first device may be somewhere in the network and establishing its identity may be difficult. In yet other cases, the accessing, first device may infect one of the known devices and may try to access another device either pretending to be a known device or piggybacking on a known device to access that other device.

However, allowing an unauthenticated device to have access to data of another device may have implications on the system, such as unauthorized access of the data, system to system failure, takeover of a device by a malicious intruder (e.g., the unauthenticated device), etc.

SUMMARY

Provided is a method for authenticating an unknown device. The method comprises: for a first device in an internet of things network that includes a second device and forms a list of trusted devices, determining a distance between the first device and the second device; identifying a level of trust for the second device based on the distance, wherein the level of trust specifies a level of data sharing; performing reputation ranking for the second device based on the level of trust; using the reputation ranking to assign a trust score to the second device; and based on determining that the trust score exceeds a trust threshold, providing access to the second device.

Provided is a computer program product for authenticating an unknown device. The computer program product comprises a computer readable storage medium having program code embodied therewith, the program code executable by at least one processor to perform: for a first device in an internet of things network that includes a second device and forms a list of trusted devices, determining a distance between the first device and the second device; identifying a level of trust for the second device based on the distance, wherein the level of trust specifies a level of data sharing; performing reputation ranking for the second device based on the level of trust; using the reputation ranking to assign a trust score to the second device; and based on determining that the trust score exceeds a trust threshold, providing access to the second device.

Provided is a computer system for authenticating an unknown device. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: for a first device in an internet of things network that includes a second device and forms a list of trusted devices, determining a distance between the first device and the second device; identifying a level of trust for the second device based on the distance, wherein the level of trust specifies a level of data sharing; performing reputation ranking for the second device based on the level of trust; using the reputation ranking to assign a trust score to the second device; and based on determining that the trust score exceeds a trust threshold, providing access to the second device.

BRIEF DESCRIPTION OF THE SEVERAL VIEWS OF THE DRAWINGS

Referring now to the drawings in which like reference numbers represent corresponding parts throughout:

FIG. 9 illustrates abstraction model layers according to an embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
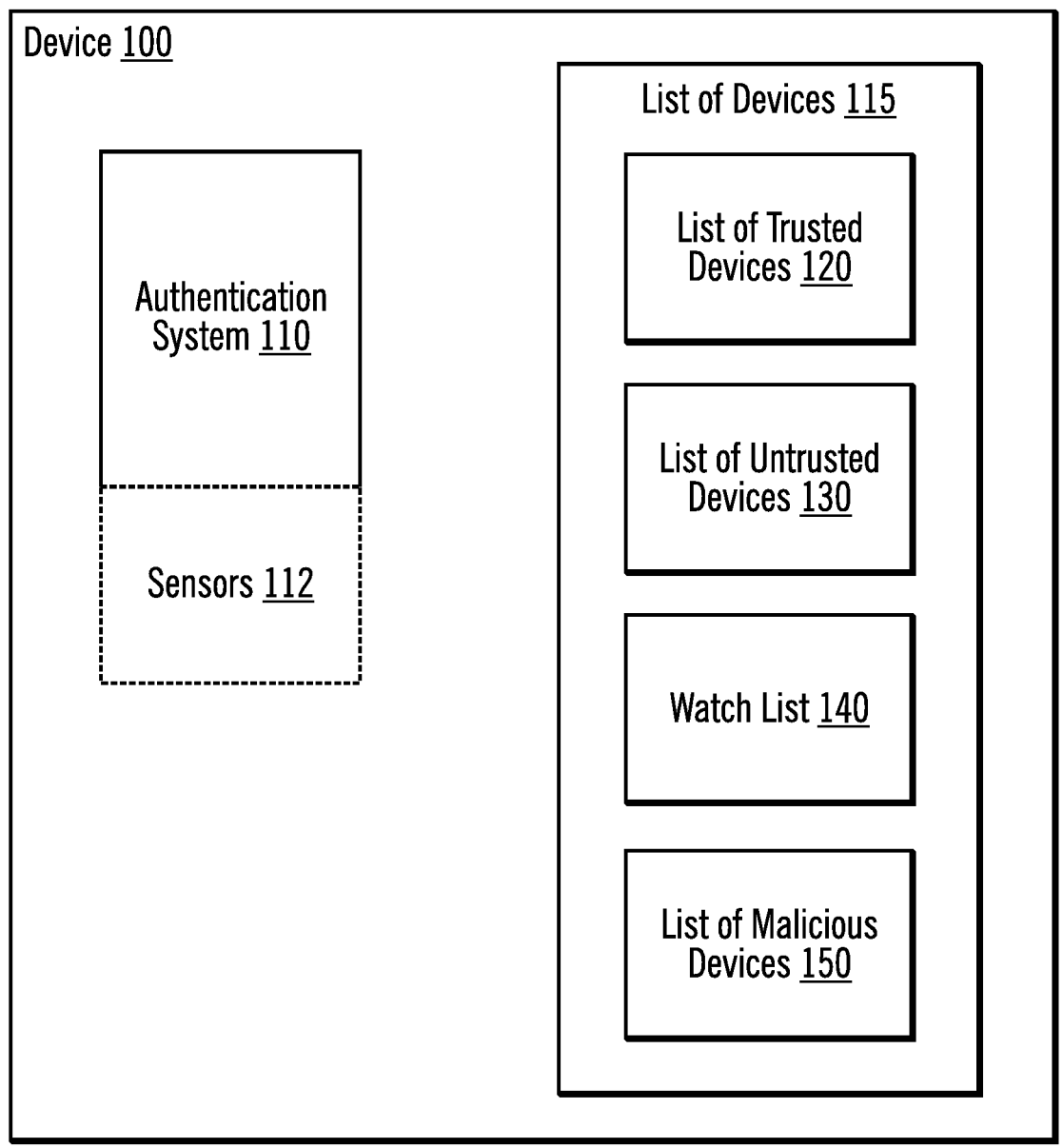
FIG. 1 illustrates, in a block diagram, a computing environment in accordance with certain embodiments.

FIG. 1 illustrates, in a block diagram, a computing environment in accordance with certain embodiments. A device 100 includes an authentication system 110 and lists of devices 115. The lists of devices 115 may include a list of trusted devices 120, a list of untrusted devices 130, a watch list 140, and a list of malicious devices 150. A requesting device is a device that is making a request to a receiving device. The receiving device receives the request. With embodiments, the authentication system 110 includes sensors 112 to receive and track information. In other embodiments, the sensors are separate from the authentication system 110, and the authentication system 110 receives information from the sensors 112.

The authentication system 110 authenticates a requesting device by classifying that requesting device as a category of a trusted device, a category of an untrusted device or an unknown device. The unknown device may be newly added to a network and so was not previously known to a receiving device.

With embodiments, the possible relationships include the following with the following hierarchy in terms of level of trust: family, friends, acquaintances, followers, following, unknown, risky, threats, foes, enemies, rogues.

With embodiments, the list of trusted devices identifies a group of devices that are known to the receiving device and that are trusted. With embodiments, the list of trusted devices include the following categories of relationships having the following hierarchy in terms of level of trust: family, friend, acquaintance, follower, and following. With embodiments, family devices are the most trusted in the hierarchy.

Family devices may be described as a group of devices that are connected together to solve a particular function. For example, a thermostat, a light control device, an occupancy detection device, a motion detection device, and a Heating, Ventilation, and Air Conditioning (HVAC) unit may work together to make a particular room or office comfortable for the occupant.

Friend devices may be described as a group of devices that may not work as closely as family devices, but which exchange information on a regular basis.

Acquaintance devices may be described as a group of devices that are not as close as family or friend devices, but still may exchange information. For example, a group of thermostats in different households may not be strongly connected, and yet they may exchange information related to optimal settings for the neighborhood or any anomaly or malicious attack on any devices.

Follower devices may be described as devices that get information from another device on a view or read only basis, without any write or edit permission. For example, a thermostat may get regular data from a weather station device, but the weather station device does not get data from the thermostat.

Following devices may be described as devices that provide information to another device on a view or read only basis. For example, the weather station device provides information to the thermostat.

With embodiments, the list of untrusted devices identifies a group of devices that are untrusted (e.g., known to be a set of rogue devices). With embodiments, the list of untrusted devices include the following categories of relationships having the following hierarchy in terms of level of trust: risky, threat, foe, enemy, rogue. With embodiments, rogue device is the least trusted in the hierarchy.

A risky device may be described as a device that does not comply with existing security guidelines and may become a threat device. Such a risky device is added to a watch list, optionally with warnings. For example, a device may maintain a record of how it is perceived by other devices. A warning is a negative score in that regard. If a device accumulates enough negative scores, the device may be considered to be a threat device. Also, if a risky device is seen to have been communicating with a higher category of foe devices, the risky device's perceived risk level increases and may be considered to be a threat device. Any device categorized as a risky device by any friend device is considered risky.

A threat device may be described as a device that was a risky device once and may have been maliciously infected or is in communication with other devices of the untrusted category. Any device categorized as a threat device by any friend device is considered risky. For example, if a risky device is determined to have been communicating with a higher category of untrusted devices, the risky device's perceived risk level increases and that device may be considered as a threat device.

A foe device may be described as a device that may be (by its own intent or by being part of an untrusted (e.g., foe) circle of devices) trying to do harm to a trusted (e.g., friend) circle of devices. Any device categorized as a foe device by any friend device is considered risky.

Enemies may be described as a collection of foe devices that cluster together to do harm to a trusted (e.g., friend) circle of devices.

Rogues devices may be described as a set of device whose impact is felt beyond the trusted (e.g., friend) circle of devices.

With embodiments, no communication is allowed for untrusted devices or any subset of untrusted devices (e.g., devices that are considered to be: threat, foe, enemy or rogue).

With embodiments, all trusted devices or any subset (e.g., friends, friends and family, etc.) of trusted devices may be said to form a trusted circle. With embodiments, all untrusted devices or any subset (e.g., foes, foes and enemy, etc.) of untrusted devices may be said to form an untrusted circle.

When an unknown requesting device makes a request to connect to a receiving device, the authentication system 110 of the receiving device attempts to determine whether the requesting device is a trusted (e.g., friend) device or an untrusted (e.g., foe) device based on the unknown requesting device's social reputation among a trusted circle of devices of the receiving device.

With the list of untrusted devices, when a device falters in keeping the trust of other devices, the authentication system 110 verifies whether this was intentional or whether this device is perceived as one of the untrusted categories of: risky, threats, foes, enemies, and rogues.

Figure 2:
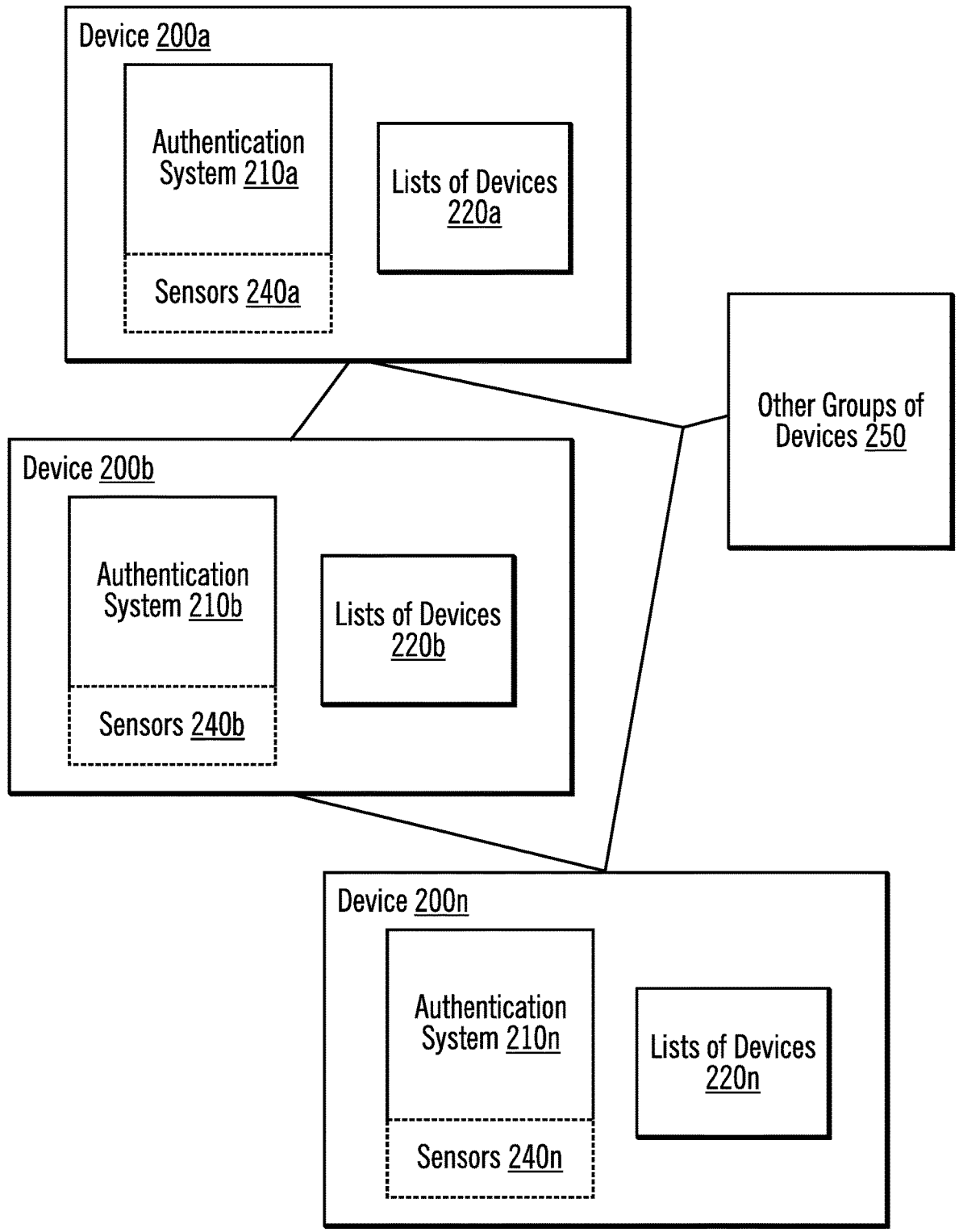
FIG. 2 illustrates a group of devices in accordance with certain embodiments.

FIG. 2 illustrates a group of devices in accordance with certain embodiments. The group of devices includes devices 200a, 200b . . . 200n. Each device 200a, 200b . . . 200n in the group of devices is coupled to each of the other devices 200a, 200b . . . 200n via a network, such as the Internet, an intranet, etc. Moreover, the group of devices 200a, 200b . . . 200n may be coupled to other groups of devices 250. Each of the devices 200a, 200b . . . 200n includes an authentication system, lists of devices (such as the lists of devices shown in FIG. 1), and sensors. For example, device 200a includes an authentication system 210a, lists of devices 220a, and sensors 240a; device 200b includes an authentication system 210b, lists of devices 220b, and sensors 240b; and device 200n includes an authentication system 210n, lists of devices 220n, and sensors 240n.

With embodiments, the devices 200a, 200b . . . 200n may be, for example, computing systems, smart phones, smart televisions (that have computing power and can connect to networks, such as the internet) or items that include the device. Items that may include a device 200*a*, 200*b* . . . 200*n* include, for example: clothing, shoes, smart home devices (e.g., appliances (refrigerators, washers, dryers, etc.), thermostats, lights, televisions, etc.), heart monitoring implants or other implants, transponders, automobiles, buildings, etc.

Embodiments are based on the concept of a social media platform for devices. With embodiments, the authentication system 110 makes trusted device and untrusted device decisions based on multilayer determinations.

With embodiments, there is a reputation ranking based on a level of trust of a group of devices. The group of devices may be a group of friend devices, a group of family and friend devices or any other group of devices of any combination of categories of relationships. For a particular device, each device in the group is ranked based on a level of trust that is based on a distance (e.g., "friendship" distance) between that particular device and each other device in the group of devices. For example, the ranking is based on whether that device is a direct friend device of the particular device or a friend of a friend device. A friend of a friend device relationship may be described as a relationship that is an order less than a direct friend relationship. This order is defined as a distance. With embodiments, the distance is determined using the list of friend devices. The following are example lists of friend devices:

device A—list of friend devices includes device B device B—list of friend devices includes device A and device C device C—list of friend devices includes device B In the above example, device C is a friend of a friend device for device A. The level of trust for data sharing depends on the distance. For example, for a short distance, such as between device A and device B of the example, access to all data of device A may be given to device B. However, for a longer distance, such as between device A and device C, limited access to data of device A may be given to device C. For certain maximum distances (e.g., exceeding a distance threshold), the level of trust may be partly or totally restricted.

Based on the level of trust, the authentication system 110 of a device ranks the other devices in a group of devices. With embodiments, an enemy device of a particular device's enemy has a chance of becoming a friend device of that particular device. For example, if device A's enemy is device D, and device D's enemy is device E, then device E has a chance of becoming a friend of device A.

Embodiments create a graph (e.g., a "friendship" graph) with a node for each of the devices in a group of devices and with lines between the nodes that are based on the distance between each device. For added security, each node in the graph may have bounded connectivity or fan out. That is, each node may be allowed a limited maximum number of direct friends. This connectivity may be updated at certain intervals. Over time, the distance between two devices may change. For example, as the level of trust increases over time, a friend of a friend device may become a direct friend device to a particular device or to other devices in a friend cluster. A friend cluster may be a group of devices in which each device is a friend device to at least one other device. The distance may be reduced or may be increased based on the connectivity between devices.

Embodiments provide multi-level protection. For example, each device is recommended by other (e.g., friend) devices that vouch for any unknown (new) device that may want to join the group of devices. When an unknown device tries to access or connect to a particular device, the authentication system 110 of the particular device first determines the distance with the unknown device and then determines the level of trust for that distance.

If the unknown device is not currently at in a trusted circle (i.e., for a friend circle, not a friend through connections of friends), the authentication system 110 may still establish communication with the unknown device with a minimum level of trust. This may occur if the unknown device was in the trusted circle sometime in the history of the group of devices and was not moved to the group of foe devices by any devices in the trusted circle. If the unknown device is neither a trusted device nor an untrusted device, the authentication system 110 may add the unknown device to a watch list for the time being until a minimum level of trust is developed.

Figure 3:
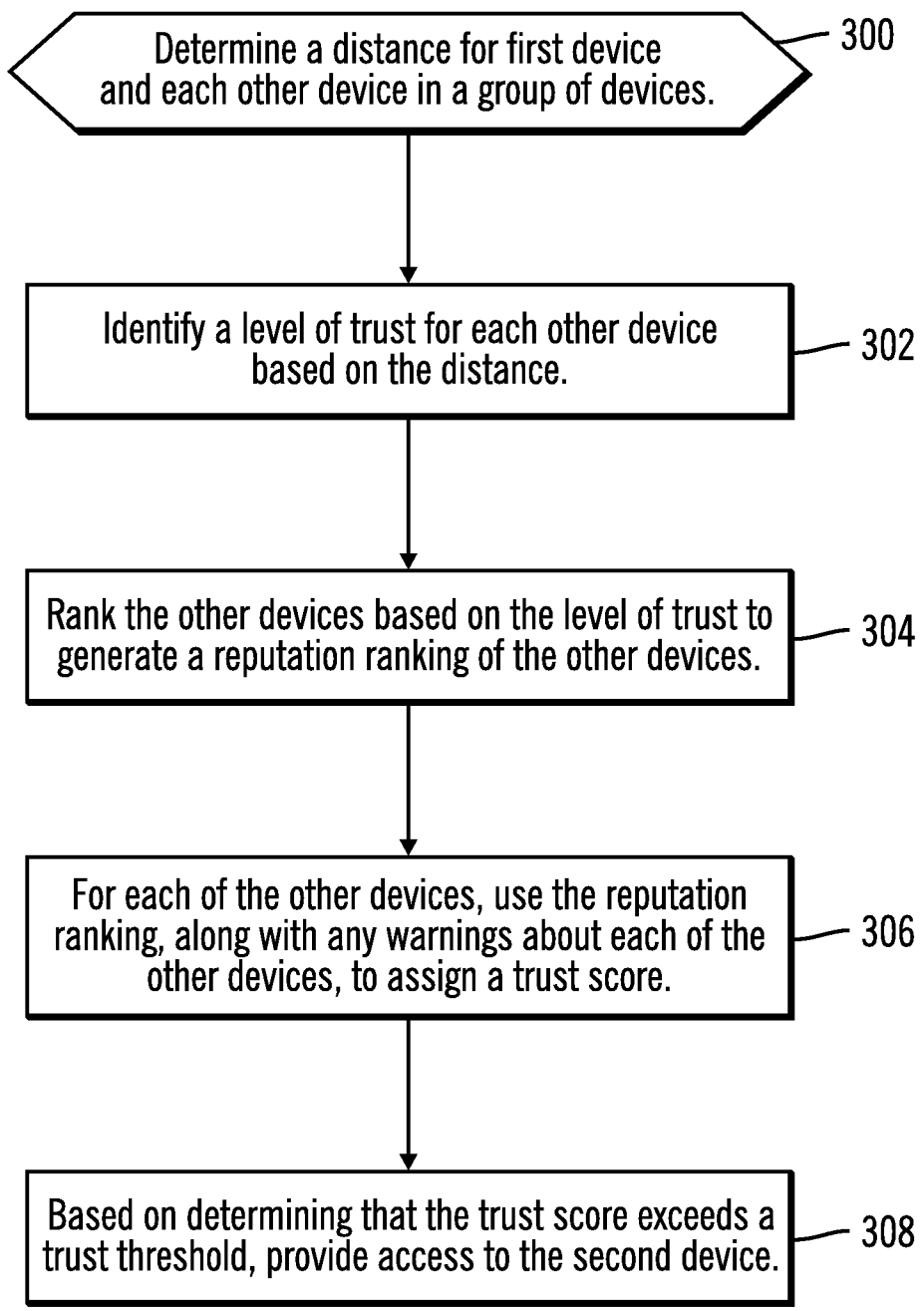
FIG. 3 illustrates, in a flow chart, operations for reputation ranking in accordance with certain embodiments.

FIG. 3 illustrates, in a flow chart, operations for reputation ranking in accordance with certain embodiments. Control begins at block 300 with an authentication system of a first device determining a distance for that first device and each other device in a group of devices. A distance may be said to be "between" any two devices, and the group of devices may be a group of IoT devices. In block 302, the authentication system of the first device identifies a level of trust for each other device based on the distance. In block 304, the authentication system of the first device ranks the other devices based on the level of trust to generate a reputation ranking of the other devices. For example, the devices may be ranked in order of devices with higher trust scores to devices of lower trust scores.

In block 306, for each of the other devices, the authentication system of the first device uses the reputation ranking, along with any warnings about each of the other devices, to assign a trust score. For example, a risky device may be added to a watch list with some warnings, which may be negative scores that lower the trust score. In block 308, based on determining that the trust score exceeds a trust threshold, the authentication system of the first device provides access to the second device (i.e., the second device may access data of the first device). The second device may be an unknown device. Thus, if the trust score does not exceed the trust threshold, access from the second device to data of the first device is denied.

Figure 4:
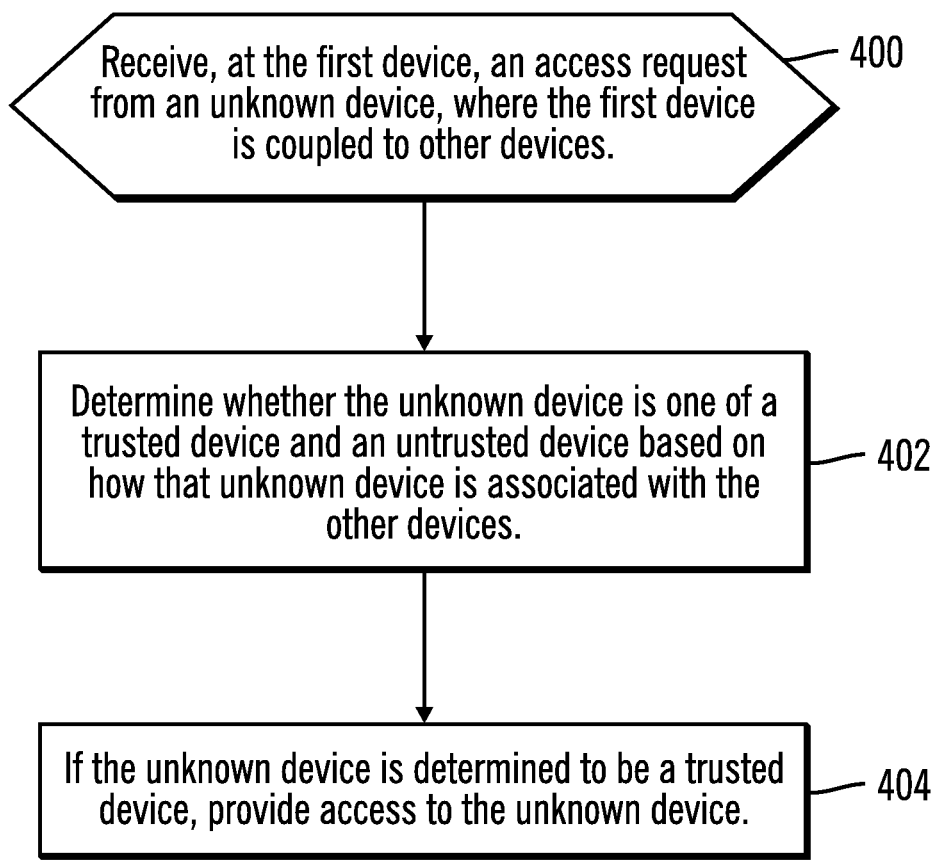
FIG. 4 illustrates, in a flow chart, operations for determining whether to provide access to an unknown device based on untrusted devices (e.g., friend devices) and untrusted devices (e.g., foe devices) in accordance with certain embodiments.

FIG. 4 illustrates, in a flow chart, operations for determining whether to provide access to an unknown device based on trusted devices (e.g., friend devices) and untrusted devices (e.g., foe devices) in accordance with certain embodiments. Control begins at block 400 with the authentication system of the first device receiving an access request from an unknown device. In block 402, the authentication system of the first device determines whether the unknown device is one of a trusted device and an untrusted device based on how that unknown device is associated with other devices coupled to the first device. How the unknown device is associated with the other devices may include determining the category of relationship (e.g., friend or foe) between that unknown device and each of the other devices. In block 404, if the unknown device is determined to be a trusted device, the authentication system of the first device provides access to the unknown device.

In alternative embodiments, a list of trusted devices is used for authentication. In certain embodiments, if a receiving device (or other entity, such as a server) wants to know whether to trust an unknown device, the authentication system of the receiving device sends a request to each of the devices in the list of trusted devices (which list may dynamically change) to assign a numeric trust score to the unknown device. The authentication system determines an average trust score over the trusted devices in the list of trusted devices (which is a finite list of devices that are directly trusted) and, based on a trust threshold, the authentication system determines whether to trust the unknown entity.

With embodiments, if a device is one of the contacted devices and is requested to assign a trust score to an unknown device (at least unknown to the device requesting the trust score), then that contacted device looks for the unknown device in its list of trusted devices and list of untrusted devices. The contacted device assigns a trust score to the unknown device based on whether the unknown device is found on the list of trusted devices, found on the list of untrusted devices or not found on either list. Then, the contacted device returns the trust score.

With embodiments, the trust computation is dynamic as the devices on the lists and the trust threshold may change (for example, a trust threshold may be lower for a request for access to read a water meter device, but may be very high for a request for access that may shut down a patient monitoring system)

Figure 5:
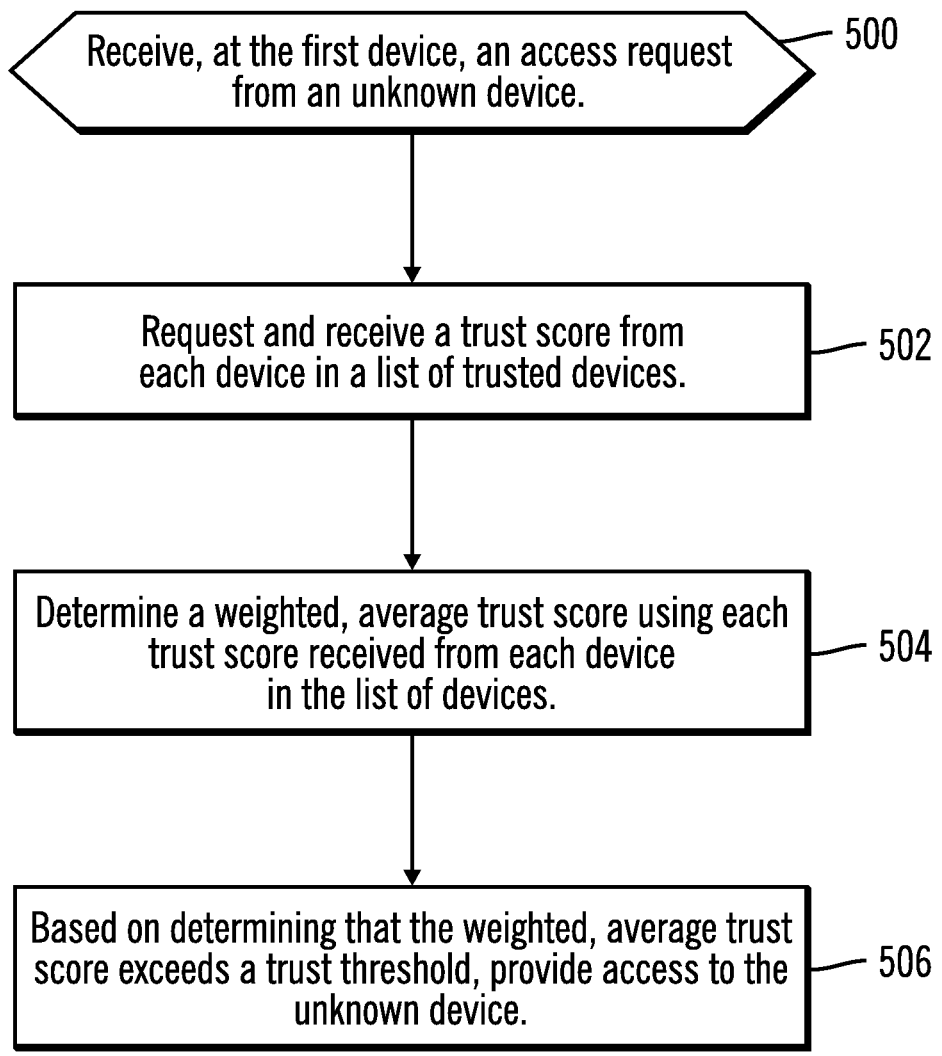
FIG. 5 illustrates, in a flow chart, operations for determining whether to provide access to an unknown device based on trust scores in accordance with certain embodiments.

FIG. 5 illustrates, in a flow chart, operations for determining whether to provide access to an unknown device based on trust scores in accordance with certain embodiments. Control begins at block 500 with the authentication system of the first device receiving an access request from an unknown device. In block 502, the authentication system of the first device requests and receives a trust score from each device in a list of trusted devices. In block 504, the authentication system of the first device determines a weighted, average trust score using each trust score received from each device in the list of devices. For example, if the first device trusts device B more than device C, then, the first device would adjust the trust score from device B (upwards) and/or device C (downwards). In block 506, based on determining that the weighted, average trust score exceeds a trust threshold, the authentication system of the first device provides access to the unknown device (i.e., the unknown device may access data of the first device). Thus, if the weighted, average trust score does not exceed the trust threshold, access from the unknown device to data of the first device is denied.

Thus, with embodiments, a first device polls other devices in the trusted group to compute a trust score for the new device.

Figure 6:
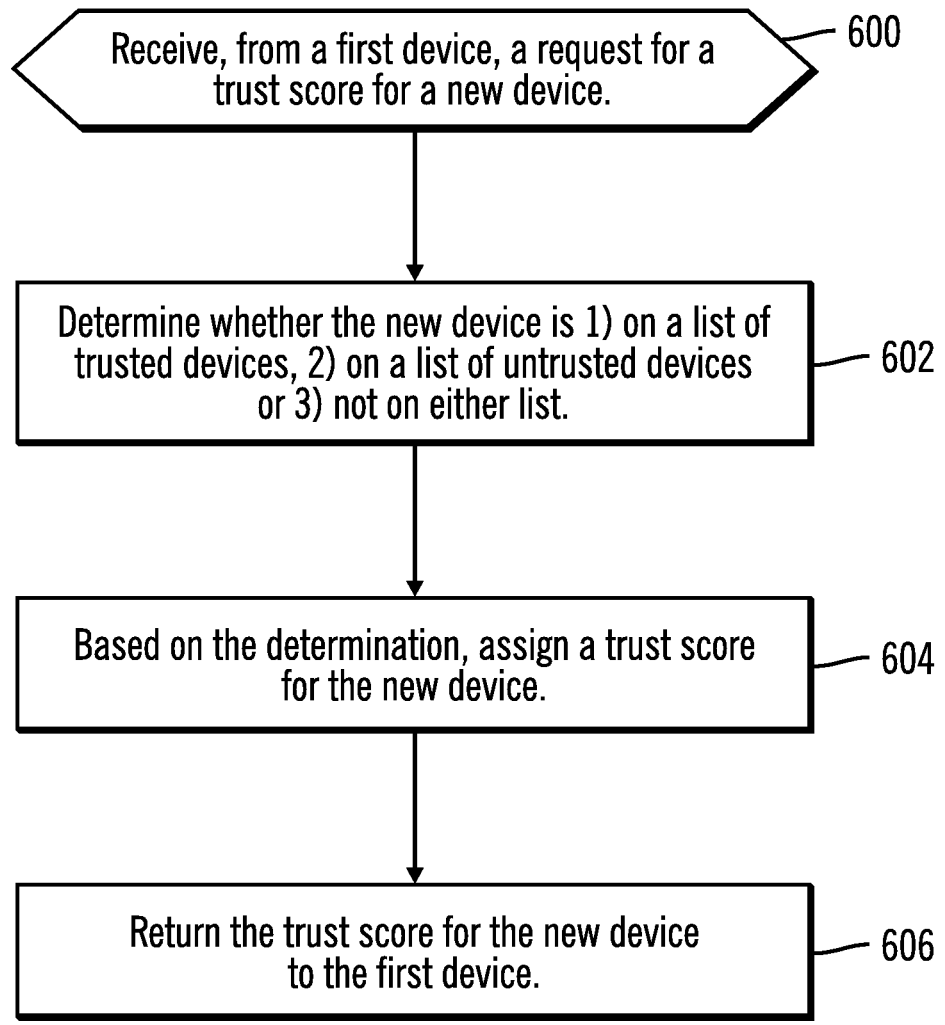
FIG. 6 illustrates in a flow chart, operations for determining a trust score in accordance with certain embodiments.

FIG. 6 illustrates in a flow chart, operations for determining a trust score in accordance with certain embodiments. Control begins at block 600 with the authentication system of a second device receiving, from a first device, a request for a trust score for a new device. In block 602, the authentication system of the second device determines whether the new device is 1) on a list of trusted devices, 2) on a list of untrusted devices or 3) not on either list. In block 604, the authentication system of the second device, based on the determination, assigns a trust score for the new device. In block 606, the authentication system of the second device returns the trust score for the new device to the first device.

In various embodiments, the new device may be unknown to the first device and/or the second device. In certain embodiments, when a contacted device is requested to provide a trust score for a new device, the contacted device looks at a list of trusted devices, a list of untrusted devices, and a list of devices that do not have trust scores. For example, when an IOT network is initially built, all the devices are unknown to one another. Similarly, when some additional network or device is added to the existing system, the newly added network or device is unknown to the rest of the devices. In fact even when two existing systems are connected to each other, it is possible that the devices within each system may be known to one another, but they would be unknown to the devices in the other system. Within these lists, there may be scores and conditions associated with each one of them. For example, the contacted device may take into account context parameters and may return a trust score based on those context parameters. For example if there has been a certain attack on devices at a certain time, a device may be more suspect and reduce the trust score of all devices in general. The opposite might happen otherwise.

In certain embodiments the device requesting the trust score from the contacted device provides the context parameters. Thus, devices may vouch for a new device within a context.

With alternative embodiments, instead of each device maintaining a list of trusted devices, a group of devices may share a list of trusted devices. For example, any of a set of a blockchain ledger keepers may keep a current list of trusted devices. A blockchain may be described as a system in which everything is kept in an open ledger based system in an encrypted format, so that every interested device may see and verify each transaction.

With embodiments, if a foe device or enemy device causes a malicious activity to a device in the group of devices, group of devices may let other devices know of such activity, which will eventually lower the trust score of the foe and enemy devices. In certain embodiments, this is done by putting the name of the rogue device in a list of malicious devices. The number of notifications that a particular device has been malicious is combined together using a weighted factor of the severity of the malicious activity. This list of malicious devices may be accessed by all devices that would like to find out about the reputation of an unknown device.

Thus, embodiments deny access to known devices by an unauthenticated, unknown to avoid unauthorized access of data, system to system failure, takeover by malicious intruders, etc.

With embodiments, the trust scores and which devices are in which groups (i.e., group membership) change over time.

Figure 7:
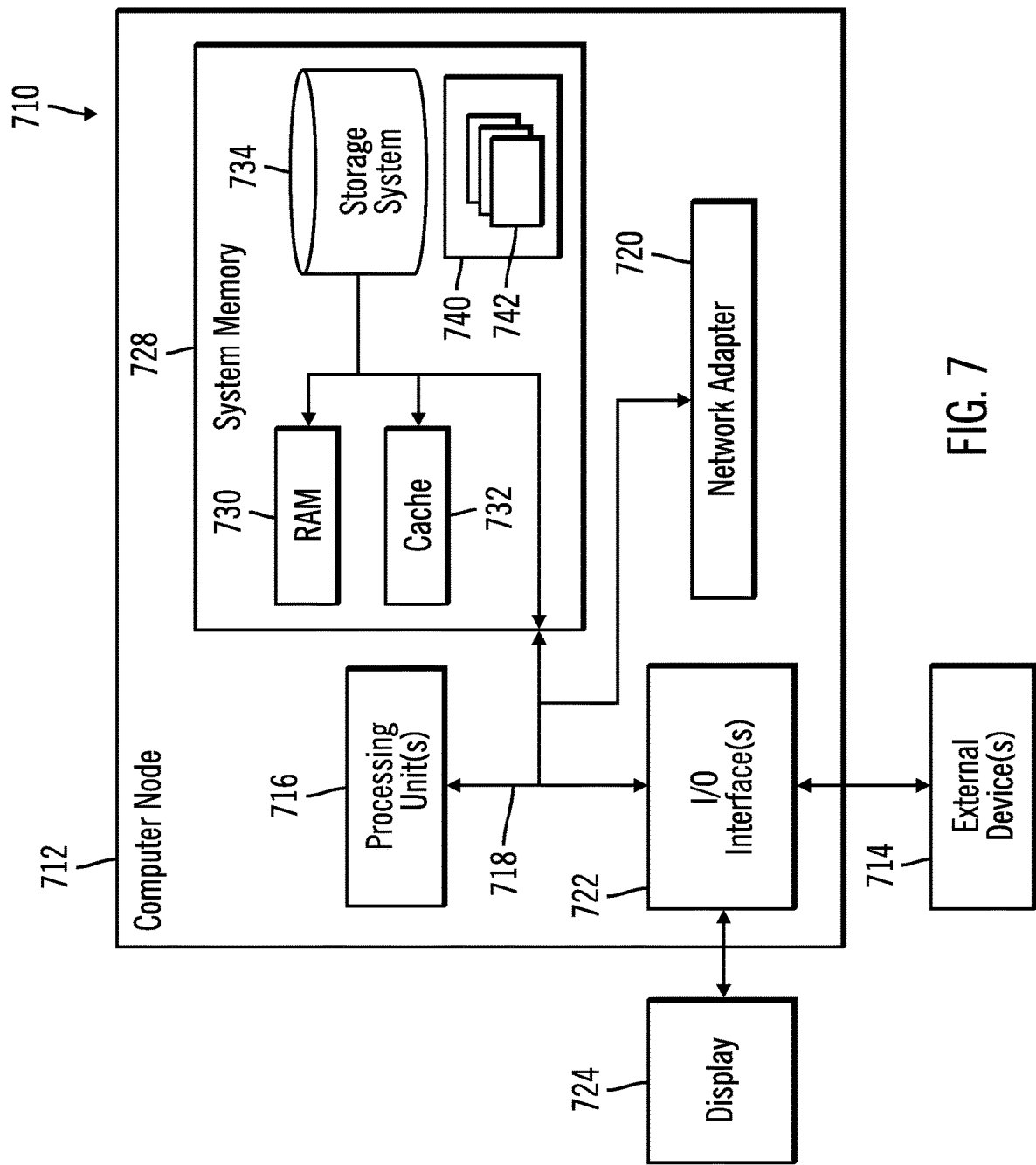
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system.

Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the device 100 has the architecture of computer node 712. In certain embodiments, the device 100 is part of a cloud infrastructure. In certain alternative embodiments, the device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
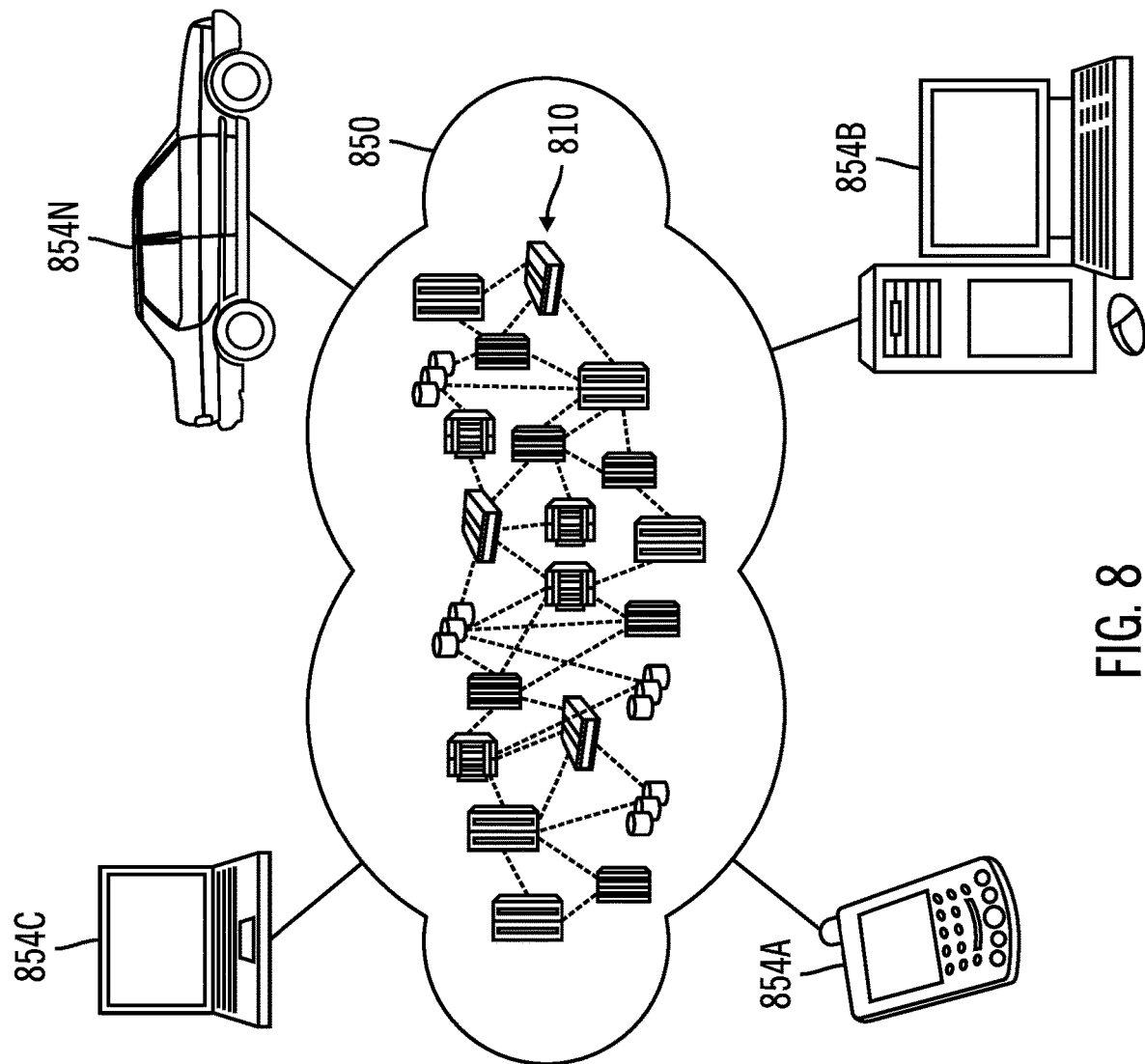
FIG. 8 illustrates a cloud computing environment according to an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and authenticating an unknown device 996.

Thus, in certain embodiments, software or a program, implementing authenticating an unknown device in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    for a first device in an internet of things network that includes a plurality of other devices, storing a list of trusted devices, a list of untrusted devices, and a watch list;
    determining a distance between the first device and each of the plurality of other devices;
    identifying a level of trust for each of the plurality of other devices based on the distance, wherein the level of trust specifies a level of data sharing;

ranking each of the plurality of other devices based on the level of trust; and for a second device of the plurality of other devices,
determining whether the second device is designated as a risky device that is on the watch list and has one or more warnings, wherein each of the one or more warnings indicates a negative score, and wherein each negative score indicates how the second device is perceived by another device of the plurality of other devices;

in response to determining that the second device is designated as the risky device on the watch list, assigning a trust score to the second device based on the ranking; and lowering the trust score by each negative score indicated by each of the one or more warnings;

based on determining that the trust score exceeds a trust threshold, providing access to the second device for data of the first device; and based on determining that the trust score does not exceed the trust threshold, denying the access to the second device for the data of the first device; and for an unknown device that is not in the plurality of other devices,
receiving a trust score from each of the plurality of other devices in the list of trusted devices;
determining a weighted, average trust score using each trust score received from each device of the plurality of other devices; and
based on determining that the weighted, average trust score exceeds the trust threshold, providing the access to the unknown device for the data of the first device.

2. The computer-implemented method of claim 1, further comprising operations for:
in response to the unknown device that is not in the list of trusted devices trying to access the first device,
determining that the unknown device is not in the list of untrusted devices; and
interacting, at the first device, with the unknown device based on a minimum level of trust.

3. The computer-implemented method of claim 1, further comprising operations for:
determining that the level of trust for the second device has dropped;
in response to the determination, identifying the second device as one of threat, foe, enemy, and rogue; and
blocking, at the first device, communication of the second device.

4. The method of claim 1, further comprising operations for:
in response to the unknown device trying to access the first device,
sending a request to each device of the plurality of other devices for the trust score of the unknown device, wherein each device of the plurality of other devices generates the trust score based on whether the unknown device is on another list of trusted devices for that device.

5. The computer-implemented method of claim 4, wherein each of the plurality of other devices generates the trust score of the unknown device based on multiple factors.

6. The computer-implemented method of claim 1, further comprising operations for:
in response to a third device causing malicious activity to the first device, putting the third device on a list of malicious devices, wherein a number of times the third device is added to the list of malicious devices is combined with a weighted factor of a severity of malicious activity to generate a level of trust of the third device.

7. The computer-implemented method of claim 1, wherein a Software as a Service (SaaS) is configured to perform the operations of the method.

8. A computer program product, the computer program product comprising a computer readable storage medium having program code embodied therewith, the program code executable by at least one processor to perform operations comprising:
for a first device in an internet of things network that includes a plurality of other devices, storing a list of trusted devices, a list of untrusted devices, and a watch list;
determining a distance between the first device and each of the plurality of other devices;
identifying a level of trust for each of the plurality of other devices based on the distance, wherein the level of trust specifies a level of data sharing;
ranking each of the plurality of other devices based on the level of trust; and
for a second device of the plurality of other devices,
determining whether the second device is designated as a risky device that is on the watch list and has one or more warnings, wherein each of the one or more warnings indicates a negative score, and wherein each negative score indicates how the second device is perceived by another device of the plurality of other devices;
in response to determining that the second device is designated as the risky device on the watch list, assigning a trust score to the second device based on the ranking; and
lowering the trust score by each negative score indicated by each of the one or more warnings;
based on determining that the trust score exceeds a trust threshold, providing access to the second device for data of the first device; and
based on determining that the trust score does not exceed the trust threshold, denying the access to the second device for the data of the first device; and
for an unknown device that is not in the plurality of other devices,
receiving a trust score from each of the plurality of other devices in the list of trusted devices;
determining a weighted, average trust score using each trust score received from each device of the plurality of other devices; and
based on determining that the weighted, average trust score exceeds the trust threshold, providing the access to the unknown device for the data of the first device.

9. The computer program product of claim 8, wherein the program code is executable by at least one processor to perform further operations comprising:
in response to the unknown device that is not in the list of trusted devices trying to access the first device,
determining that the unknown device is not in the list of untrusted devices; and
interacting, at the first device, with the unknown device based on a minimum level of trust.

10. The computer program product of claim 8, wherein the program code is executable by at least one processor to perform further operations comprising:
  determining that the level of trust for the second device has dropped;
  in response to the determination, identifying the second device as one of threat, foe, enemy, and rogue; and
  blocking, at the first device, communication of the second device.

11. The computer program product of claim 8, wherein the program code is executable by at least one processor to perform further operations comprising:
  in response to the unknown device trying to access the first device,
    sending a request to each device of the plurality of other devices for the trust score of the unknown device, wherein each device of the plurality of other devices generates the trust score based on whether the unknown device is on another list of trusted devices for that device.

12. The computer program product of claim 11, wherein each of the plurality of other devices generates the trust score of the unknown device based on multiple factors.

13. The computer program product of claim 8, wherein the program code is executable by at least one processor to perform further operations comprising:
  in response to a third device causing malicious activity to the first device, putting the third device on a list of malicious devices, wherein a number of times the third device is added to the list of malicious devices is combined with a weighted factor of a severity of malicious activity to generate a level of trust of the third device.

14. The computer program product of claim 8, wherein a Software as a Service (SaaS) is configured to perform the operations of the computer program product.

15. A computer system, comprising:
  one or more processors, one or more computer-readable memories and one or more computer-readable, tangible storage devices; and
  program instructions, stored on at least one of the one or more computer-readable, tangible storage devices for execution by at least one of the one or more processors via at least one of the one or more memories, to perform operations comprising:
    for a first device in an internet of things network that includes a plurality of other devices,
      storing a list of trusted devices, a list of untrusted devices, and a watch list;
      determining a distance between the first device and each of the plurality of other devices;
      identifying a level of trust for each of the plurality of other devices based on the distance, wherein the level of trust specifies a level of data sharing;
      ranking each of the plurality of other devices based on the level of trust; and
      for a second device of the plurality of other devices,
        determining whether the second device is designated as a risky device that is on the watch list and has one or more warnings, wherein each of the one or more warnings indicates a negative score, and wherein each negative score indicates how the second device is perceived by another device of the plurality of other devices;
        in response to determining that the second device is designated as the risky device on the watch list,
          assigning a trust score to the second device based on the ranking; and
          lowering the trust score by each negative score indicated by each of the one or more warnings;
        based on determining that the trust score exceeds a trust threshold, providing access to the second device for data of the first device; and
        based on determining that the trust score does not exceed the trust threshold, denying the access to the second device for the data of the first device; and
      for an unknown device that is not in the plurality of other devices,
        receiving a trust score from each of the plurality of other devices in the list of trusted devices;
        determining a weighted, average trust score using each trust score received from each device of the plurality of other devices; and
        based on determining that the weighted, average trust score exceeds the trust threshold, providing the access to the unknown device for the data of the first device.

16. The computer system of claim 15, wherein the operations further comprise:
  in response to the unknown device that is not in the list of trusted devices trying to access the first device,
    determining that the unknown device is not in the list of untrusted devices; and
    interacting, at the first device, with the unknown device based on a minimum level of trust.

17. The computer system of claim 15, wherein a Software as a Service (SaaS) is configured to perform the operations of the computer system.

18. The computer system of claim 15, wherein the operations further comprise:
  determining that the level of trust for the second device has dropped;
  in response to the determination, identifying the second device as one of threat, foe, enemy, and rogue; and
  blocking, at the first device, communication of the second device.

19. The computer system of claim 15, wherein the operations further comprise:
  in response to the unknown device trying to access the first device,
    sending a request to each device of the plurality of other devices for the trust score of the unknown device, wherein each device of the plurality of other devices generates the trust score based on whether the unknown device is on another list of trusted devices for that device.

20. The computer system of claim 15, wherein the operations further comprise:
  in response to a third device causing malicious activity to the first device, putting the third device on a list of malicious devices, wherein a number of times the third device is added to the list of malicious devices is combined with a weighted factor of a severity of malicious activity to generate a level of trust of the third device.

* * * * *